(12) United States Patent
Tzeng et al.

(10) Patent No.: US 9,196,905 B2
(45) Date of Patent: Nov. 24, 2015

(54) DIAMOND FILM COATED ELECTRODE FOR BATTERY

(71) Applicant: National Cheng Kung University, Tainan (TW)

(72) Inventors: Yonhua Tzeng, Tainan (TW); Orlando H Auciello, Garland, TX (US); Chuan-Pu Liu, Tainan (TW); Chi-Kai Lin, Naperville, IL (US); Yin-Wei Cheng, Westmont, IL (US)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 171 days.

(21) Appl. No.: 14/164,451

(22) Filed: Jan. 27, 2014

(65) Prior Publication Data

US 2014/0212763 A1  Jul. 31, 2014

Related U.S. Application Data

(60) Provisional application No. 61/758,811, filed on Jan. 31, 2013.

(51) Int. Cl.
| | |
|---|---|
| *H01M 4/62* | (2006.01) |
| *H01M 4/134* | (2010.01) |
| *H01M 4/1395* | (2010.01) |
| *H01M 10/052* | (2010.01) |

(52) U.S. Cl.
CPC .............. *H01M 4/625* (2013.01); *H01M 4/134* (2013.01); *H01M 4/1395* (2013.01); *H01M 10/052* (2013.01); *Y02E 60/122* (2013.01)

(58) Field of Classification Search
CPC ... H01M 4/134; H01M 4/1395; H01M 4/625; H01M 10/052; Y02E 60/122
See application file for complete search history.

(56) References Cited

U.S. PATENT DOCUMENTS

2009/0324810 A1 * 12/2009  Serikawa ............ C02F 1/46109
427/78

OTHER PUBLICATIONS

Orlando Auciello, Anirudha V. Sumant, Status review of the science and technology of ultrananocrystalline diamond (UNCD) films and application to multifunctional devices, Diamond & Related Materials, 2010, p. 699-718, 19.

* cited by examiner

*Primary Examiner* — Brittany Raymond
(74) *Attorney, Agent, or Firm* — Bacon & Thomas, PLLC

(57) ABSTRACT

A composite electrode and a lithium-based battery are disclosed, wherein the composite electrode comprises: a substrate and a conductive layer formed on the substrate, wherein the conductive layer comprises graphite powders, Si-based powders, Ti-based powders, or a combination thereof embedded in a conductive matrix and coated with diamond films, and the diamond films are formed of diamond grains. The novel electrodes of the present invention when used in the Li-based battery can provide superior performance including excellent chemical inertness, physical integrity, and charge-discharge cycling life-time, and exhibit high electric conductivity and excellent lithium ion permeability.

17 Claims, 4 Drawing Sheets

DIAMOND FILM COATED ELECTRODE FOR BATTERY

CROSS REFERENCE TO RELATED APPLICATION

This application claims the benefit of filing date of U. S. Provisional Application Ser. No. 61/758,811, entitled "Nanocrystalline-Diamond/Carbon and Nanocrystalline-Diamond/Silicon Composite Electrodes for Li-Based Batteries" filed Jan. 31, 2013 under 35 USC §119(e)(1).

BACKGROUND OF THE INVENTION

1. Field of the Invention

The present invention relates to a composite electrode and a lithium-based (Li-based) battery using the same, and especially relates to a composite electrode coated with microstructured diamond films and a Li-based battery using the same.

2. Description of Related Art

Currently natural graphite (NG) is used for making electrodes for Li related batteries (LB) because of its low cost (a target price below US$10/Kg), high Coulombic efficiency, low volume expansion after whole lithiation (~10%), and high electronic conductivity ($0.4-2.5 \times 10^4$ S cm$^{-1}$ on the basal plane). However, LB using NG electrodes has the problem of large irreversible capacity loss and short cycling life due partly to the reactivity of natural graphite with organic electrolytes. Reactions between natural graphite and the electrolyte may form solid-electrolyte-interphase (SEI) films and the generation of organic gases such as hydrogen, CO, $CO_2$, methane, ethylene, and propylene within interlayers of NG crystals, which may cause irreversible capacity loss and damages to the natural graphite structure, and reduce cycling performance of the battery.

Excessive chemical and electrochemical reactions between NG and the electrolyte and the subsequent deposition and accumulation of undesirable electrically insulating SEI on the surface of the NG electrodes worsens at the electrode surface area where high local charging and discharging current density (hot spots) occurs.

Dendritic growth of SEI compound occurs in graphite electrode areas of high reactivity and high charging or discharging current density, leading to the electrical shorting and hazardous failure of the LB. This poses a major huddle against practical applications to electrical vehicles, for which natural graphite based economic LB exhibiting high-rate charging and discharging cycle performance are required.

Attempts have been made to suppressing the undesirable electrolyte-graphite reactions have shown limited success. Most of the methods involve coating NG with polymer, alkali carbonate, and lithium benzoate. These coatings have shown some success to a limited extent depending on the electrochemical characteristics of the specific coatings.

Nanocrystalline diamond (NCD) films, with grain size in the 10-999 nm range, and particularly ultrananocrystalline diamond (UNCD) films (2-10 nm grain size) are known. They are formed mainly with sp$^3$ bonded carbon atoms, and exhibit high hardness, exceptional tribological properties, chemical inertness, biocompatibility, negative electron affinity with proper chemical treatment. These films have been used in, for example, coating tools to reduce wear and tear.

It is also known that nitrogen atoms, when incorporated in the grain boundaries of UNCD and NCD films, satisfy dangling carbon bonds and provide electrons for conduction through the grain boundaries. The UNCD films with nitrogen in the grain boundaries are named N-UNCD. The NCD films with nitrogen in the grain boundaries are named N-NCD. Boron atoms, when substitute carbon atoms in the lattice of the diamond grains provide holes to the valence band via a true p-type semiconductor doping mechanism. The UNCD films with boron atoms substituting C atoms in the diamond lattice are named B-UNCD. The NCD films with boron atoms substituting C atoms in the diamond lattice are named B-NCD.

N-UNCD and N-NCD are known to possess a high density of grain boundaries consisting of substantial sp$^2$ carbon bonds, including graphitic carbon phases, and exhibit excellent chemical and electrochemical inertness, high mechanical strength, and good electrical conductivity with nitrogen atoms being incorporated into the grain boundaries.

SUMMARY OF THE INVENTION

Since UNCD and NCD have the aforementioned advantages, an object of the present invention is to provide a novel microstructured composite electrode applied with UNCD or NCD to solve the problem of undesirable electrolyte-graphite reactions and to improve the physical integrity of the electrode. Additionally, the present invention also provides a Li-based battery comprising the novel microstructured composite electrode of the present invention.

To achieve the object, the composite electrode of the present invention comprises: a conductive substrate; and a conductive layer formed on the conductive substrate, wherein the conductive layer comprises microstructured or nanostructured materials such as carbon based powders including graphite powders, Si-based powders, Ti-based powders, or a combination thereof coated with diamond films. The diamond films are formed of diamond grains and carbon species which fill the boundaries between diamond grains. Especially, the conductive layer of the composite of the present invention comprises the graphite powders such as natural graphite (NG) powders or synthetic graphite (SG) powders, and the diamond films coated on the graphite powders can be formed of UNCD or NCD grains.

Although UNCD and NCD have been developed in coating tools to reduce wear and tear, both UNCD and NCD have not been used to coat natural graphite electrodes for the Li-based batteries because it was not known that Li ion can permeate through UNCD and NCD films. Recognizing the problems, the present inventors investigated and discovered that UNCD and NCD can be made to have high Li-ion permeability. With this discovery, the inventors developed chemically robust, electrically conductive UNCD and NCD coated electrodes for LB and obtained Li batteries which are orders of magnitude superior compared to what is known in the art and potentially capable to enable a 500 miles electric car. Particularly, the UNCD or UCD films used in the composite electrode of the present invention have electrically conductive and lithium permeable properties. Hence, the conductive layer of the composite electrode of the present invention can exhibit high electrical conductivity, lithium-atom permeability, chemical and electrochemical inertness, and mechanical strength, by using electrically conductive UNCD/graphite powders (UNCD/C), NCD/graphite powders (NCD/C), UNCD/Si-based powders (UNCD/Si), NCD/Si-based powders (NCD/Si) composites. Therefore, the performance of Li-ion, Li-sulfur or any other Li-based batteries with electrodes making use of these composites can further be used.

In the composite electrode of the present invention, the conductive substrate is not particularly limited, and can be a metal substrate, a glass substrate, a ceramic substrate, or a plastic substrate which are coated by conductive films. Preferably, the substrate used in the composite electrode of the present invention is a metal substrate, such as a Cu substrate.

In the composite electrode of the present invention, the conductive layer may comprise graphite powders, Si-based powders, Ti-based powders, or a combination thereof coated with diamond films. Herein, the graphite powders, the Si-based powders, the Ti-based powders, or the combination thereof may be embedded in a conductive matrix (substrate), or in a form of porous matrix. Preferably, the conductive layer comprises the graphite powders embedded in a conductive matrix (substrate) and coated with diamond films; or the conductive layer comprises the graphite powders in the form of porous matrix and coated with diamond film.

In the aspect that the conductive layer comprises the graphite powders embedded in a conductive matrix (substrate), the graphite powders adhere on the substrate. The surfaces of the graphite powders which are to be exposed to electrolyte are coated with diamond films. The diamond films have uniformly distributed and covalently bonded carbon atoms forming diamond grains surrounded by grain boundaries containing other carbon species including graphitic carbon phases. Additionally, in another aspect that the conductive layer comprises the graphite powders in the form of porous matrix, the graphite powders are coated with diamond films with uniformly distributed and covalently bonded carbon atoms forming diamond grains surrounded by grain boundaries containing $sp^2$ carbon atoms bonds. In both the aforementioned aspects, the graphite powders may be replaced by Si-based powders, Ti-based powders, or a combination of graphite powders, Si-based powders and Ti-based powders. When Si-based microstructured or nanostructured materials such as Si particle powders are used to replace the graphite powders to form the composite electrode of the present invention, the Si particle powders may be embedded in a conductive matrix (substrate) or in the form of porous Si matrix, and those powders which are exposed to the electrolyte are coated with the diamond films.

In the composite electrode of the present invention, the diamond films are formed of diamond grains, and the diamond grains used herein can be nanocrystalline diamond (NCD) grains or ultrananocrystalline diamond (UNCD) grains. Preferably, the diamond grains used herein are substantially all NCD grains or UNCD grains. The NCD grains used in the present invention can have grain sizes of 10-999 nm, preferably 10-300 nm, more preferably 10-100 nm, and most preferably 10-50 nm. In addition, the UNCD grains used in the present invention can have grain sizes of 1-10 nm, preferably 2-10 nm, and more preferably 2-5 nm.

In the composite electrode of the present invention, the diamond films can be nitrogen-doped diamond films, boron-doped diamond films, or boron nitrogen-doped diamond films. Preferably, the diamond films are nitrogen-incorporated or doped NCD (N-NCD) films, nitrogen-incorporated or doped UNCD (N-UNCD) films, boron-doped NCD (B-NCD) films, boron-doped UNCD (B-UNCD) films, boron and nitrogen-doped NCD (B-N-NCD) films, or boron and nitrogen-doped UNCD (B-N-UNCD) films. The grain sizes of the N-NCD, N-UNCD, B-NCD, B-UNCD, B-N-NCD or B-N-UNCD are the same as those illustrated above.

In the aspect that the diamond films are nitrogen-doped diamond films, nitrogen (N) atoms inserting into the grain boundaries can satisfy $sp^2$ carbon-atom bonds and supply electrons moving through the grain boundaries to provide the high electrical conductivity of N-UNCD, N-NCD, B-N-UNCD or B-N-UNCD while retaining the chemical inertness of the diamond film. In another aspect that the diamond films are boron-doped diamond films, boron (B) atoms substituting C atoms in the diamond lattice besides incorporation into the grain boundaries can provide holes to the valence band for B-UNCD, B-NCD, B-N-NCD or B-N-UNCD films to be electrically conductive while retaining the chemical inertness of the diamond film. In all of the N-NCD, N-UNCD, B-NCD, B-UNCD, B-N-NCD and B-N-UNCD, the doped N atoms and/or B atoms can provide high electrical conductivity, exhibiting high diffusivity of lithium atoms through the conductive layer of the composite electrode of the present invention.

The electrical conductivity and chemical resistance to chemical attack in harsh environments, such as in Li-based batteries, make N-UNCD, B-UNCD or N-NCD, B-NCD coatings promising for high performance electrodes for these batteries. The new electrodes of the present invention achieve their superior performance because they substantially suppress the undesirable excessively high reactivity between local hot spots on the graphite surface and the electrolyte. Local hot spots with high reactivity on graphite surface lead to the cracking of the graphite electrode and dendritic growth of lithium compound structures. The graphitic grain boundaries in the N-UNCD or N-NCD provide effective conduction channels for lithium ions between the electrolyte and the NG while the finite resistance of these graphitic conduction channels helps distribute lithium ion current more uniformly across the surface of the anode for suppressing the possibility of much higher current density at local areas and the possible dendritic growth of lithium compound structures. The invention embodied coating materials exhibiting high electrical conductivity and high resistance to chemical attack for electrodes in Li-based battery. Exemplary embodiments of this invention include N-UNCD, B-UNCD, B-UNCD and B-NCD/Carbon (graphite powders) composite. Combination of both substituted boron doping of the diamond grains and nitrogen incorporation in the grain boundaries (B-N-UNCD and B-N-NCD) can further improve the electrical conductivity.

Hence, the invention also provides a N-UNCD/C or N-NCD/C or B-UNCD/C, or B-NCD/C composite with uniformly distributed ultrananocrystalline or nanocrystalline diamond grains such that the $sp^3$ chemical bonding of C atoms in the N-UNCD or N-NCD or B-UNCD, or B-NCD coating provide a much more chemically resistant material in contact with the Li-based harsh environment of the battery while the uniformly distributed $sp^2$ bonded carbon phases predominantly in the grain boundaries and/or in the grain boundaries between diamond grains provide a uniform path for high electrical conductivity and high diffusivity for lithium atoms. Substituted boron doping and/or incorporated nitrogen doping provides additional electrical conductivity through the boron doped diamond grains, the nitrogen doped diamond grains, or the boron nitrogen-doped diamond grains.

In addition, in the composite electrode of the present invention, the diamond films have a thickness more than 10 nm–100 µm, preferably more than 100 nm–100 µm, and more preferably more than 1000 nm–100 µm. Furthermore, the diamond films of the present invention are substantially free of through-film voids.

The present invention also provides a Li-based battery with the aforementioned composite electrode, wherein the nanostructure thereof can provide large area interacting with the Li-atoms for high-energy output from the battery. More specifically, the Li-based battery of the present invention comprises a composite electrode made of N-UNCD, B-UNCD, N-NCD, B-NCD, B-N-NCD or B-N-UNCD coated NG, SG, Si-based powders, Ti-based powders or a combination thereof. Further more specifically, the lithium-based battery of the present invention comprises: one of the aforementioned composite electrodes; a counter electrode opposite to the composite electrode; a Li permeable and electrically insulating separator membrane between two electrodes; and an electrolyte disposed between the composite electrode and the counter electrode and on both sides of the separator.

In addition, the present invention further provides a method for manufacturing the aforementioned composite electrode comprising the following steps: providing a conductive substrate with powders formed thereon, wherein the powders are graphite powders, Si-based powders, Ti-based powders, or a combination thereof; and coating the powders with diamond films to form a conductive layer on the conductive substrate. Herein, the powders can be separated particles, formed into a porous matrix, or embedded in the substrate.

In the method of the present invention, the diamond films can be grown by any conventional manner generally used in the art. For example, the diamond films with or without N and/or B doping are grown using microwave plasma chemical vapor deposition (MPCVD), hot filament chemical vapor deposition (HFCVD), DC plasma chemical vapor deposition (DCPECVD), or arc jet chemical vapor deposition (AJCVD). More specifically, the N-UNCD, N-NCD, B-UNCD, B-NCD, B-N-NCD or B-N-UNCD films of the present invention can be made by gases or vapor of hydrocarbon or oxyhydrocarbon compounds diluted by noble gases (such as He and Ar) or hydrogen through the aforementioned manners.

When the MPCVD is used to grow the diamond films of the present invention, gas mixtures made of methane diluted by noble gases (such as He and Ar) or hydrogen are used to grow N-UNCD, N-NCD, B-NCD, B-UNCD, B-N-NCD or B-N-UNCD. For example, the plasma used in the MPCVD is produced by microwave involving a mixture of $CH_4$, Ar, and $N_2$ with appropriate gas percentage combinations to produce electrically conductive UNCD films via N atoms insertion into the grain boundaries. In some case, the plasma is produced by microwave involving a mixture of $CH_4$, Ar, $H_2$, and $N_2$ with appropriate gas percentage combinations. Preferably, a $H_2$ (95-99%)/ $CH_4$ (1-5%) gas mixture containing vapor of boron compounds such as Trimethylboron (TMB) or diborane is used to grow B-NCD films, and the content of the boron compounds is 0.0001-1% based on the total amount of $H_2$ and $CH_4$ gas. Preferably, an Ar (95-99%)/$CH_4$ (1-5%) gas mixture containing nitrogen or vapor of boron compounds is used to grow N-UNCD or B-UNCD films, and the content of the boron compounds is 0.0001-1% and that of the nitrogen is 1-40% based on the total amount of $H_2$ and $CH_4$ gas. More preferably, an Ar (75-80%)/$CH_4$ (2-5%)/$N_2$ (15-20%) gas mixture is used to grow N-UNCD films. In addition, the plasma can be produced by alternate-current of a frequency lower than that of microwave or direct-current electrical power for CVD.

When the HFCVD is used to grow the diamond films of the present invention, gas mixtures of methane diluted by noble gases (such as He and Ar) or hydrogen are used to grow N-UNCD, N-NCD, B-NCD, B-UNCD, B-N-NCD or B-N-UNCD. For example, B-UNCD or B-NCD films are grown by using a mixture of Ar, $CH_4$, $H_2$, and B with appropriate gases percentage composition. Preferably, a $H_2$ (95-98%)/$CH_4$ (2-5%) gas mixture with vapor of boron compounds such as TMB or diborane is used to grow B-NCD films, and the content of the boron compounds is 0.0001-1% based on the total amount of $H_2$ and $CH_4$ gas. Preferably, an Ar (95-99%)/ $CH_4$ (1-5%) gas mixture containing nitrogen or vapor of boron compounds is used to grow N-UNCD, N-NCD, B-UNCD or B-NCD films, and the content of the boron compounds is 0.0001-1% and that of the nitrogen is 1-40% based on the total amount $H_2$ and $CH_4$ gas.

When the AJCVD is used to grow the diamond films of the present invention, gas mixtures of methane diluted by noble gases (such as He and Ar) or hydrogen are used to grow N-UNCD, N-NCD, B-NCD, B-UNCD, B-N-NCD or B-N-UNCD. For example, B-UNCD or B-NCD films are grown by using a mixture of Ar, $CH_4$, $H_2$, and B with appropriate gases percentage composition. For example, B-UNCD or B-NCD films are grown by using a mixture of Ar, $CH_4$, $H_2$, and B with appropriate gases percentage composition. Preferably, a $H_2$ (95-98%)/$CH_4$ (2-5%) $_g$as mixture containing vapor of boron compounds is used to grow B-NCD films, and the content of the boron compounds is 0.0001-1% based on the total amount of $H_2$ and $CH_4$ gas. Preferably, an Ar (95-99%)/$CH_4$ (1-5%) gas mixture containing nitrogen or vapor of boron compounds is used to grow N-UNCD, N-NCD, B-UNCD or B-NCD films, and the content of the boron compounds is 0.0001-1% and that of the nitrogen is 1-40% based on the total amount of $H_2$ and $CH_4$ gas.

The invention consists of specific novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

Other objects, advantages, and novel features of the invention will become more apparent from the following detailed description when taken in conjunction with the accompanying drawings.

DETAILED DESCRIPTION OF THE PREFERRED EMBODIMENT

In general, nanostructured carbon materials are synthesized by plasma enhanced chemical vapor deposition (PECVD), in which chemically activated carbon based molecules are produced. However, hot filament enhanced chemical vapor deposition (HFCVD), involving a large array of parallel tungsten or any other filament heated by passing a current, can be used to break $CH_4$ molecules impacting on the filament, to produce the C atoms needed for growing diamond films. For instance, hydrogen-rich (~99% $H_2$) $CH_4/H^2$ plasmas are used for growing microcrystalline diamond (MCD)

and NCD films, wherein large amounts of atomic hydrogen play a critical role in both the gas phase and surface growth chemistries. Atomic hydrogen is also needed to selectively etch the non-diamond carbon phase during growth of the MCD or NCD films.

Hydrogen-poor Ar/CH4 (99% Ar, 1% CH4) chemistries can be used to grow ultrananocrystalline diamond (UNCD) films, which consist of diamond grains 2-10 nm in size and atomically abrupt high energy grain boundaries, as described in a recent comprehensive review.

The composition and morphology of the material grown is not simply a function of the gas mixture and plasma conditions, but also depends sensitively on the pretreatment of the substrate prior to growth as well as the substrate temperature. There is a high nucleation barrier for growing diamond containing carbon materials and that certain pretreatments are necessary to provide the initial nucleation sites. The presence of microcrystalline diamond (MCD), nanocrystalline diamond (NCD) or ultrananocrystalline diamond (UNCD) particles on the substrate surface prior to the diamond growth are desirable for the growth of diamond seeds to form continuous films. Besides, bias-enhanced nucleation can also provide diamond nuclei for further grain growth and formation of continuous diamond films. In addition, the temperature window for PECVD growth of MCD and NCD films may range from 400-1300° C. while UNCD films may be prepared at temperature ranged from 300° C. to 1000° C.

Thus, one may use the MPCVD and HFCVD processes to grow the electrically conductive N-UNCD or N-NCD or B-UNCD or B-NCD coatings over the graphite/metal-based matrix for producing the electrodes for Li-based batteries. Hereinafter, the method for manufacturing a composite electrode of the present invention is described in detail.

Fabrication and Characterization of N-UNCD/C Composite Electrodes

Figure 1A:
FIGS. 1A-1C are cross-sectional views showing a process for manufacturing an electrode for Li-based battery according to a preferred embodiment of the present invention.
Figure 1B:
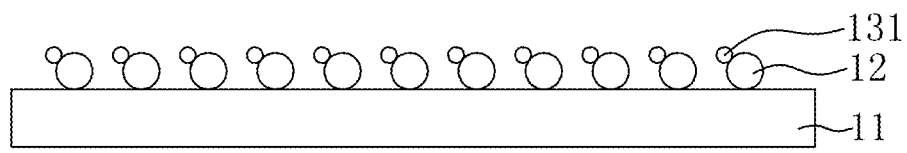
Figure 1C:
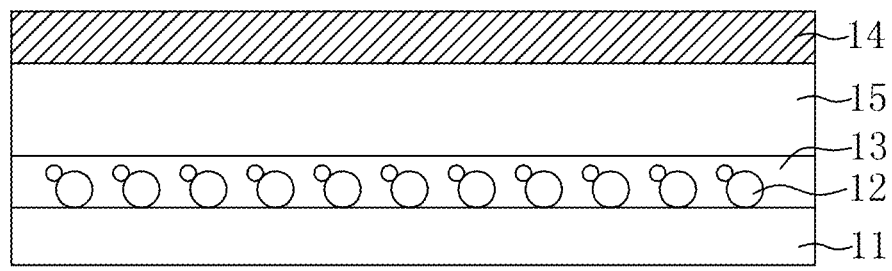

FIGS. 1A-1C are cross-sectional views showing a process for manufacturing a Li-based half-cell of the present embodiment. As shown in FIG. 1A, a substrate 11 is provided, and NG powders 12 are printed or sprayed thereon. These powders can be closely packed or loosely packed Next, as shown in FIG. 1B, NCD or UNCD particles 131 are seeded on the substrate 11 to adhere on surfaces of the NG powders 12. After the process for growing the diamond grains from the NCD or UNCD particles 131, the loosely packed NG powders 12 are coated with a NCD or UNCD film formed of the grown diamond grains to obtain a conductive layer 13. For closely packed powders, the top surfaces of powders which will be in contact with the electrolyte are coated with a NCD or UNCD film formed of the grown diamond grains to obtain a conductive layer 13. After the aforementioned steps, a composite electrode comprising the substrate 11 and the conductive layer 13 formed of NG powders 12 coated with NCD or UNCD film 13 formed of diamond grains is obtained. Finally, as shown in FIG. 1C, a thin separator 15 and a counter electrode 14 are sequentially laminated on the conductive layer 13 of the composite electrode, and then an electrolyte is injected therein between two electrodes and in both sides of the separator to obtain a Li-based battery.

One exemplary method to produce N-UNCD/C composite electrode is described below. This method can be applied to fabricate other electrodes with different UNCD or NCD coatings.

Spherical NG powders of different sizes (1-25 μm grain size) can be produced by processing of NG flakes by ball milling. Theses NG powders (i.e. the NG powders 12 shown in FIG. 1A) are then coated with pitch. The anode (LB negative electrode) is made by casting slurry made of 92 wt % NG, 8 wt % PVDF (KF 9130) and dispersed in N-methyl-2-pyrrolidone, on a copper foil (i.e. the substrate 11 shown in FIG. 1A) by an active loading of 10 mg cm$^{-2}$. The electrode is then dried in a vacuum oven. The thickness of dried NG in this example is 75 μm, when using slurry made with 25 μm grain size of graphite. However, the thickness of the NG layer can be tailored by changing the size of the graphite powder particles. Li metal is used as the counter electrode (i.e. the counter electrode 14 shown in FIG. 1C) to fabricate a Li/NG half-cell. The exemplary battery also has a microporous polypropylene separator (Celgard 2325) (i.e. the separator 15 shown in FIG. 1C), a counter electrode (Li) (i.e. the counter electrode 14 shown in FIG. 1C), and an appropriate amount of electrolyte. The electrolyte in this exemplary battery is 1.2M LiPF$_6$ dissolved in mixed solvents of ethylene carbonate (EC) and ethyl methyl carbonate (EMC) with a ratio of 3:7 by weight.

Figure 2:
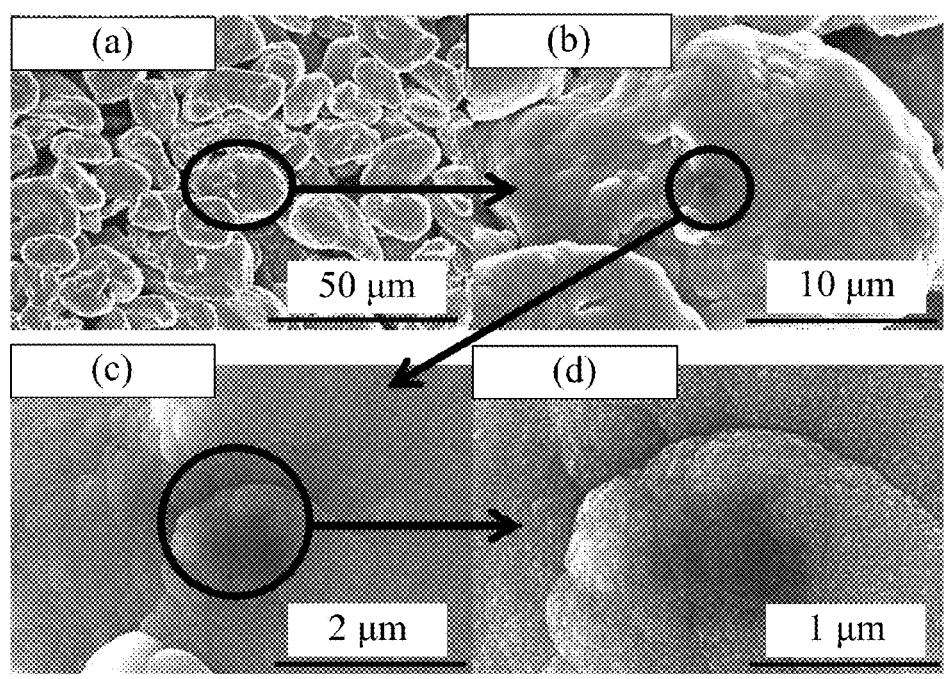
FIG. 2 shows SEM pictures of N-UNCD/C composite according a preferred embodiment of the present invention.
Figure 3:
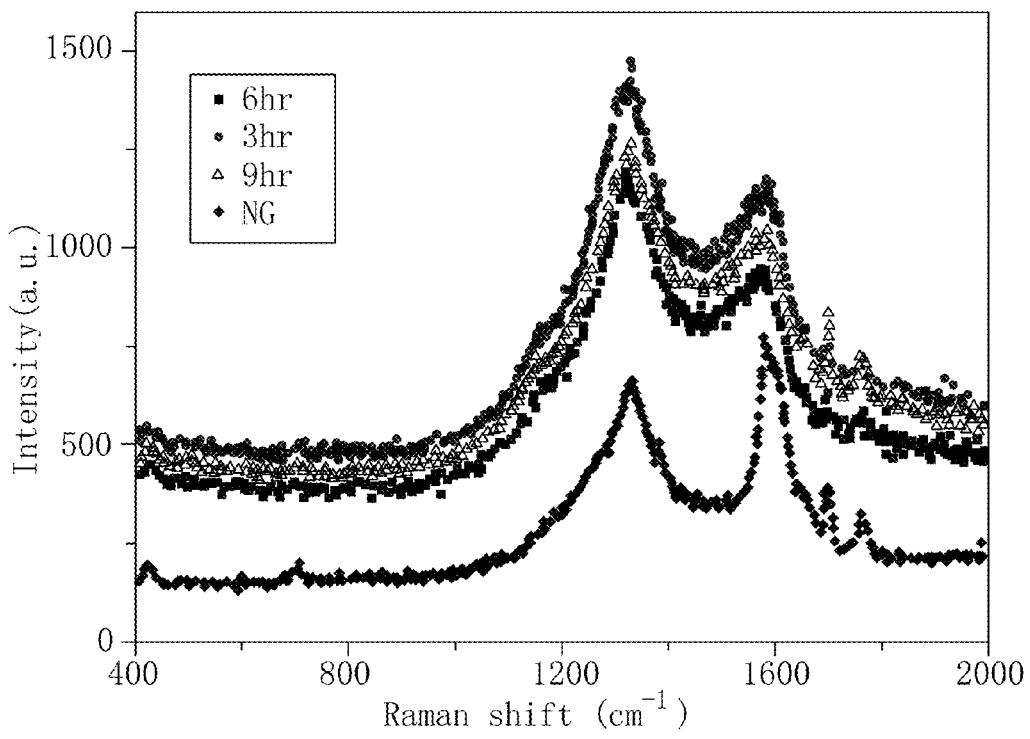
FIG. 3 is a Raman spectrum of the N-UNCD/C composites and NG according a preferred embodiment of the present invention.

Microwave plasma enhanced chemical vapor deposition (MPCVD), was used to coat the NG/metal substrate with N-UNCD films. The graphite electrode is pre-seeded with diamond nanoparticles (i.e. the NCD or UNCD particles 131 shown in FIG. 1B) by immersion in a suspension of diamond nanoparticles in methanol under ultrasonic agitation. The N-UNCD films were grown for 3 hrs, 6 hrs and 9 hrs using Ar (79 sccm)/CH$_4$ (2 sccm)/N$_2$ (20 sccm) gas mixture to produce the plasma to grow the films. The N-UNCD/C composite layer (i.e. the conductive layer 13 shown in FIG. 1C) was characterized by scanning electron microscopy (SEM) analysis and Raman analysis. FIG. 2 shows SEM pictures of N-UNCD/C composite, wherein the N-UNCD film was grown for 3 hrs; and FIG. 3 shows Raman spectra of the N-UNCD/C composites and NG, wherein the N-UNCD film was grown for 3, 6, or 9 hrs. The (a) figure in FIG. 2 is obtained under 1,000× magnification; the (b) figure is obtained under 5,000× magnification; the (c) figure is obtained under 25,000× magnification; and the (d) figure is obtained under 50,000× magnification. Herein, the circles and the arrows indicate where the enlarged image is from. The SEM pictures and the Raman spectra show the characteristic surface morphology of N-UNCD films, and the chemical bonding of the C atoms in the N-UNCD nanostructure, respectively.

Battery cells were fabricated and subjected to two charging-discharging cycles at a rate which takes ten hours for the full capacity, i.e., C/10, at ~0.35 mA, and then cycled under the following conditions: C/10, at room temperature (~27° C.), and with cell voltage between 1 mV and 1.5 V. The rate capability of lithiated graphite-based anode was evaluated by discharging NG/Li coin cells to 1 mV by C/10 and then charging them to 1.5 V by C/20, C/10, C/5, C/2, C, 2C, 5C, and 10C rates.

Figure 4:
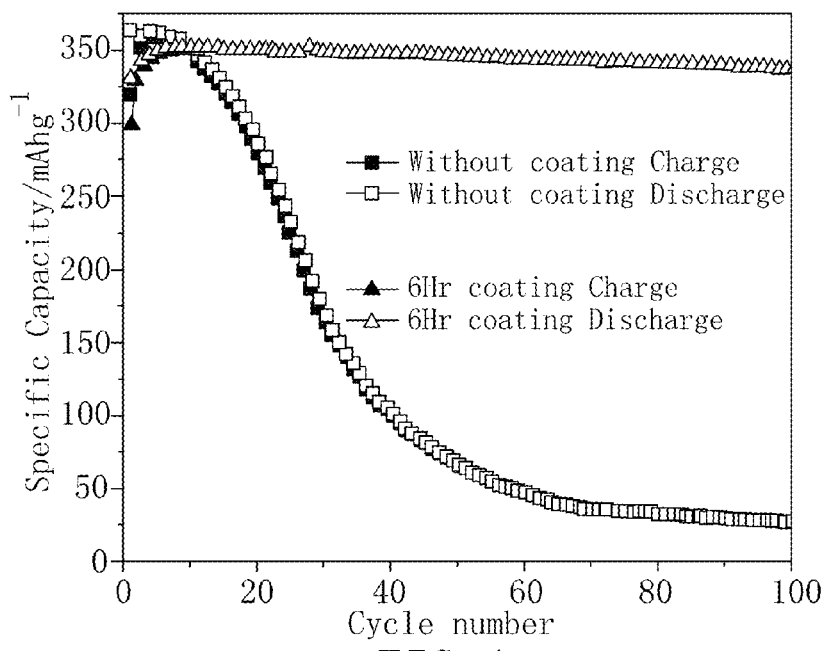
FIG. 4 shows capacity v.s. charge-discharge cycle performance of a NG electrode without and with N-UNCD coating according a preferred embodiment of the present invention.

The capacity retention for uncoated NG and N-UNCD/C composite coated NG electrodes was measured for about 100 charge-discharge cycles, and the results thereof are shown in FIG. 4. FIG. 4 shows that the capacity of the N-UNCD/C composite coated NG (wherein the N-UNCD film was grown for 6 hrs) is extremely well retained after tens of discharge-charge cycles. On the contrary, rapid decrease in the discharge-charge capacity of graphite electrode without N-UNCD coating can be seen after only less than ten discharge-charge cycles. Hence, the N-UNCD/C composite electrode of the present embodiment shows magnitude superior performance than the graphite electrode without N-UNCD coating.

Figure 5:
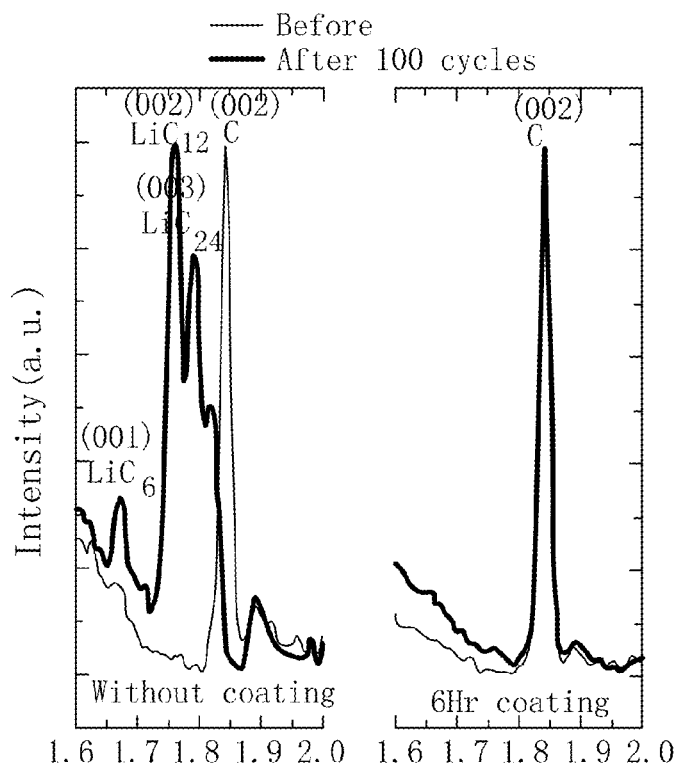
FIG. 5 shows XRD of a NG electrode without and with N-UNCD coating for the first charge-discharge cycle and the $100^{th}$ cycle according a preferred embodiment of the present invention.

The electrical performance of the N-UNCD/C composite electrodes revealed in FIG. 4 is supported by the X-ray diffraction (XRD) analysis of the pristine NG and the N-UNCD/C composite c electrodes, which shows a strong structural degradation of the NG electrode (FIG. 5 left), and practically no degradation for the N-UNCD/C composite electrode with 6 hrs N-UNCD film growth (FIG. 5 right).

Figure 6:
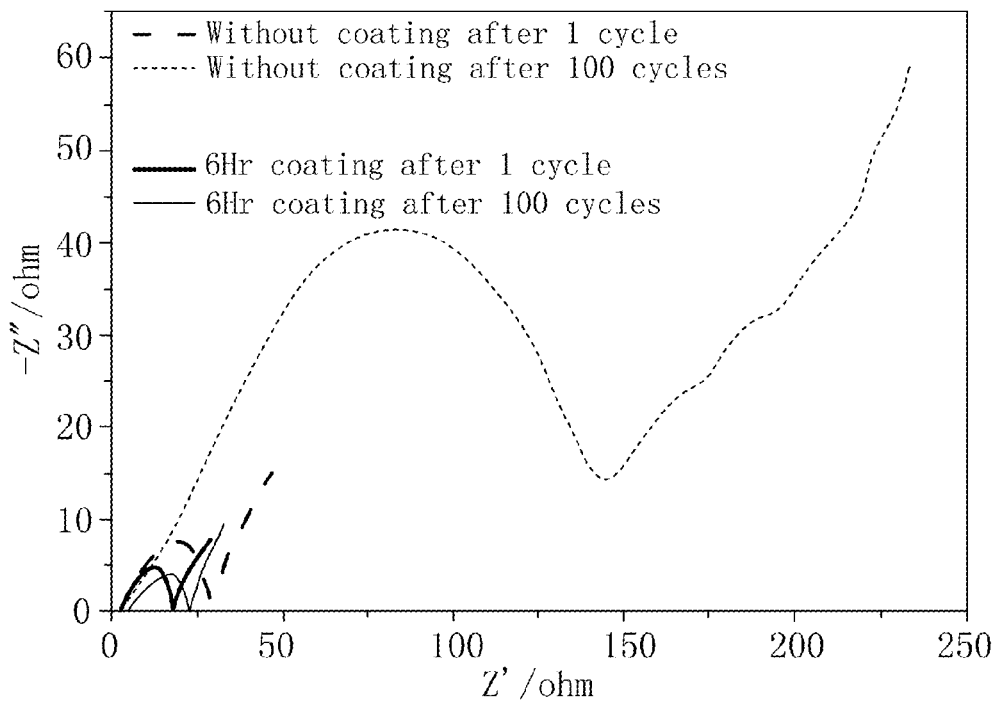
FIG. 6 shows alternate-current electrochemical impedance spectroscopy plots of a NG electrode without and with N-UNCD coating for the first charge-discharge cycle and the $100^{th}$ cycle according a preferred embodiment of the present invention.

Electrochemical impedance spectroscopy (EIS) was carried out for the LB coin cells under two testing conditions as shown in FIG. 6: of 3 charging-discharging cycles, and after 100 charge-discharge cycles. The test cells were charged by a constant current to the 20%, 40%, 60%, 80% and 100% state of charge and then allowed to take a rest for 30 minutes before making the AC impedance measurements, using a frequency response analyzer (Solartron, model 1400). The frequency window was between 500 kHz and 0.02 Hz with an applied voltage of 5 mV. Comparison of the curves for the NG uncoated electrodes and the N-UNCD/C composite electrodes confirm again the orders of magnitude superior performance of the N-UNCD/C composite electrodes.

Similar performance is valid for the B-UNCD/C, B-NCD/C, N-B-UNCD/C, or N-B-NCD/C composites. The N-UNCD/porous-C, B-UNCD/porous-C, N-NCD/porous-C, B-NCD/porous-C, N-B-UNCD/C, or N-B-NCD/C composite electrodes provide alternative high performance electrodes.

Although the present invention has been explained in relation to its preferred embodiment, it is to be understood that many other possible modifications and variations can be made without departing from the spirit and scope of the invention as hereinafter claimed.

What is claimed is:

1. A composite electrode, comprising:
   a conductive substrate; and
   a conductive layer formed on the conductive substrate,
   wherein the conductive layer comprises graphite powders, Si-based powders, Ti-based powders, or a combination thereof coated with diamond films, and the diamond films are formed of diamond grains.

2. The composite electrode as claimed in claim 1, wherein the conductive layer comprises the graphite powders.

3. The composite electrode as claimed in claim 1, wherein the substrate is a metal substrate.

4. The composite electrode as claimed in claim 1, wherein the graphite powders are natural graphite powders or synthetic graphite powders.

5. The composite electrode as claimed in claim 1, wherein the diamond grains are nanocrystalline diamond grains with grain sizes of 10-999 nm, or ultrananocrystalline diamond grains with grain sizes of 2-10 nm.

6. The composite electrode as claimed in claim 1, wherein the diamond films are nitrogen-incorporated or doped diamond films, boron-doped diamond films, or boron and nitrogen-doped diamond films.

7. The composite electrode as claimed in claim 6, wherein the nitrogen-incorporated or doped diamond films are formed of nanocrystalline diamond grains with grain sizes of 10-999 nm, or ultrananocrystalline diamond grains with grain sizes of 2-10 nm, which have nitrogen atoms inserted in mainly grain boundaries thereof.

8. The composite electrode as claimed in claim 6, wherein the boron-doped diamond films are formed of nanocrystalline diamond grains with grain sizes of 10-999 nm, or ultrananocrystalline diamond grains with grain sizes of 2-10 nm, which have boron atoms substituted carbon atoms in diamond lattices thereof.

9. The composite electrode as claimed in claim 6, wherein the boron and nitrogen-doped diamond films are formed of nanocrystalline diamond grains with grain sizes of 10-999 nm, or ultrananocrystalline diamond grains with grain sizes of 2-10 nm, which have both nitrogen atoms inserted in grain boundaries thereof and boron atoms substituted carbon atoms in diamond lattices thereof.

10. The composite electrode as claimed in claim 6, wherein the diamond films are grown by using a mixture containing hydrocarbon or oxyhydrocarbon compounds diluted by noble gases or $H_2$.

11. The composite electrode as claimed in claim 6, wherein the diamond films are grown by using a mixture containing $CH_4$ diluted by noble gases or $H_2$.

12. The composite electrode as claimed in claim 1, wherein the diamond films have a thickness of 10 nm–100 μm.

13. The composite electrode as claimed in claim 1, wherein the diamond films are grown using microwave plasma chemical vapor deposition (MPCVD), hot filament chemical vapor deposition (HFCVD), DC plasma chemical vapor deposition (DCPECVD), or arc-jet chemical vapor deposition (AJCVD).

14. A lithium-based battery, comprising:
   a composite electrode, which comprises:
   a conductive substrate; and
   a conductive layer fowled on the conductive substrate,
   wherein the conductive layer comprises graphite powders, Si-based powders, Ti-based powders, or a combination thereof coated with diamond films, and the diamond films are formed of diamond grains;
   a counter electrode opposite to the composite electrode;
   a separator disposed between the composite electrode and the counter electrode, which is an electrical insulator; and
   an electrolyte disposed between the composite electrode and the counter electrode and on both sides of the separator.

15. The lithium-based battery as claimed in claim 14, wherein the conductive layer comprises the graphite powders.

16. The lithium-based battery as claimed in claim 14, wherein the diamond grains are nanocrystalline diamond grains with grain sizes of 10-999 nm, or ultrananocrystalline diamond grains with grain sizes of 2-10 nm.

17. The lithium-based battery as claimed in claim 14, wherein the diamond films are nitrogen-incorporated or doped diamond films, boron-doped diamond films, or boron and nitrogen-doped diamond films.

* * * * *